United States Patent
Zhang et al.

(10) Patent No.: US 8,136,153 B2
(45) Date of Patent: Mar. 13, 2012

(54) SECURING CPU AFFINITY IN MULTIPROCESSOR ARCHITECTURES

(75) Inventors: Xinwen Zhang, Milpitas, CA (US); Jean-Pierre Seifert, Tirol (AT); Onur Aciicmez, San Jose, CA (US); Qingwei Ma, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 921 days.

(21) Appl. No.: 11/937,320

(22) Filed: Nov. 8, 2007

(65) Prior Publication Data

US 2009/0126006 A1 May 14, 2009

(51) Int. Cl.
*G06F 13/00* (2006.01)

(52) U.S. Cl. ......................................................... 726/17

(58) Field of Classification Search ..................... 726/17
See application file for complete search history.

(56) References Cited

U.S. PATENT DOCUMENTS

| | | | |
|---|---|---|---|
| 5,257,375 A | 10/1993 | Clark et al. | |
| 5,872,972 A | 2/1999 | Boland et al. | |
| 6,665,699 B1 | 12/2003 | Hunter et al. | |
| 7,707,578 B1 * | 4/2010 | Zedlewski et al. | 718/102 |
| 2006/0259487 A1 * | 11/2006 | Havens et al. | 707/9 |
| 2008/0126800 A1 * | 5/2008 | Guo et al. | 713/167 |

* cited by examiner

*Primary Examiner* — Ellen Tran
(74) *Attorney, Agent, or Firm* — Beyer Law Group LLP

(57) ABSTRACT

In an embodiment of the present invention, the ability for a user or process to set or modify affinities is restricted in order to method for control a multi-processor environment. This may be accomplished by using a reference monitor that controls a process' capability to retrieve and set its or another process' affinity. This aids in the prevention of security breaches.

20 Claims, 7 Drawing Sheets

10

20

|  | Object1 | Object2 | Object3 | |
|---|---|---|---|---|
| Subject1 | Read/Write | Read | Execute | Capability |
| Subject2 |  | Read | Execute | |
| Subject3 | Read | Read |  | |
|  |  | ACL |  | |

FIG. 3

SECURING CPU AFFINITY IN MULTIPROCESSOR ARCHITECTURES

BACKGROUND OF THE INVENTION

1. Field of the Invention

The present invention relates to computer security. More specifically, the present invention relates to the securing of CPU affinity in multiprocessor architectures.

2. Description of the Related Art

Widely-used modern computer systems are multitasking systems, which means that they can execute several applications and processes in parallel. This parallel execution paradigm can be realized via context switching on a processor as well as simultaneous execution on computer systems that have simultaneous-multithreading processors or multiprocessors. This feature of executing several processes in parallel brings the problem of balancing the load of the system, which is currently handled by the operating systems. Operating systems, including ones with time-slice multiplexing kernels, use scheduling algorithms to determine which threads or processes need to be executed at a given time. Since a computer system has limited resources in terms of processing power, only a certain amount of processes can actively execute at a certain time, and the kernel must have the ability to temporarily suspend the execution of a process to allow the execution of another.

SUMMARY OF THE INVENTION

In an embodiment of the present invention, the ability for a user or process to set or modify affinities is restricted in order to method for control a multi-processor environment. This may be accomplished by using a reference monitor that controls a process' capability to retrieve and set its or another process' affinity. This aids in the prevention of security breaches.

BRIEF DESCRIPTION OF THE DRAWINGS

FIG. 3 illustrates an access control matrix in accordance with an embodiment of the present invention.

DETAILED DESCRIPTION OF SPECIFIC EMBODIMENTS

Figure 1:
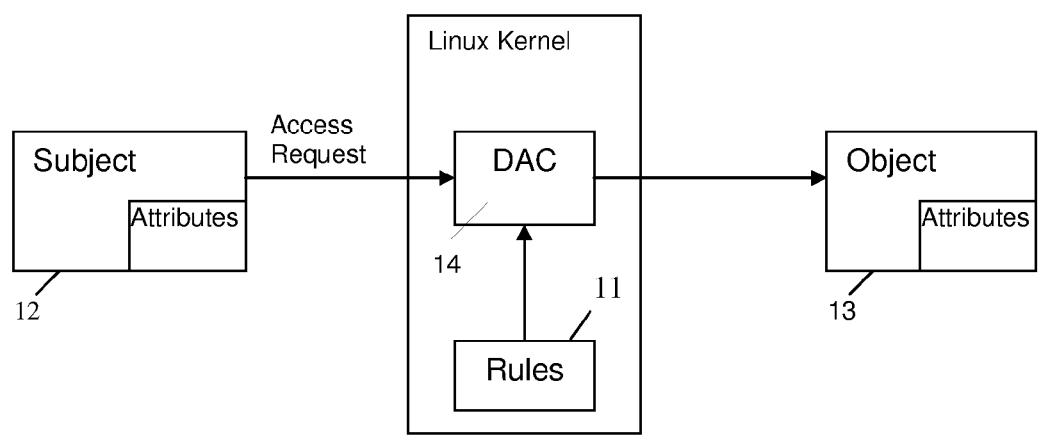
FIG. 1 depicts an architecture for a Linux kernel in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

It was discovered by the inventors of the present invention that scheduling algorithms do not consider security problems in modern multi-processor systems. This is especially true in systems that allow a user to control affinity settings. Affinity settings are that control to which processor a particular process should be or is preferred to be assigned. In Windows XP, for example, an unprivileged user can assign a process to a specific processor with a SetAffinity command. In Linux, there is a set of system calls for setting and retrieving the CPU affinity of a process. If the system does not strictly control the permissions to set the CPU affinity of a process, a spy process can freely assign itself to a processor and thus closely observe, for example, the cache activity of the processor or can create a ping-pong effect during execution of a security critical application. These effects allow a malicious party to mount efficient side-channel attacks. A malicious process can also degrade the performance of a system by excessively changing the CPU affinity settings of a time-sensitive application.

In an embodiment of the present invention, the ability for a user or process to set or modify affinities is restricted. This may be accomplished by using a reference monitor that controls a process' capability to retrieve and set its or another process' affinity.

Originally in single processor systems, the processes (or tasks or threads) were executed on the CPU sequentially, relying on a scheduling algorithm controlled by the operating system. In multiprocessor computer architectures, however, such as symmetric multiprocessing (SMP), processor affinity is a modification of the native central queue scheduling algorithm, where each process in the queue has a mask indicating its preferred/kin processor. At allocation time, each process is allocated to its kin processor in preference to others. The main motivation of processor affinity is the desire to optimize cache performance. Typically, some remnants of a process may remain in one processor's cache from the last time the process ran, and scheduling it to run on the same processor the next time could result in better execution performance for this processor compared to the case where it switches between different processor. This is very useful in that if some data are shared by multiple processes or tasks, binding these processes to a single processor can enhance system performance because the data in the cache can be reused by all these processes instead of reloading the same data into another processor's cache each time one of the processes runs. Another important benefit for time-sensitive applications such as real-time systems is that a particular processor can be dedicated to running only the time critical application, with all other processes running on other processes, without the degradation of performance of this application. This method ensures the real-time application maximally uses the processor's cycles and cache without state switching between other processes.

In WindowsNT or XP, a user can set the CPU affinity of any process through the Windows task manager, command line, or system functions. Malicious users can mount at least two attacks using such a process, as explained in the following scenarios:

1. A real-time application (e.g., Pt) is running in dedicated processor. A malicious software (e.g., Pm) can keep changing the processor affinity of Pt to force Pt to be continually switched between different CPUs. This way the malicious software can degrade the system performance and even cause denial of service attacks to some time-sensitive applications.

2. A cipher process (e.g., Pc) is running on a dedicated processor to accelerate its computing. A spy process (e.g., Ps) can change the processor affinity of Pc or itself so that both Ps and Pc are running on the same processor. Ps then can easily watch the cache activity of Pc. This can effectively enable Ps to learn secret keys used in Pc and send this information to other parties.

In computer security, Discretionary Access Control (DAC) provides an access control model in which a subject with owner permissions is capable of passing permissions to any other subject. However, the fundamental weakness in the DAC model is that the ability to grant and use access also allows malicious software to obtain control of important system resources.

SELinux is an initiative by the National Security Agency, which attempts to address such weaknesses. SELinux uses Mandatory Access Control (MAC) mechanisms that provide only those necessary accesses a program needs to perform its task (also known as the principle of least privilege). SELinux is an implementation of MAC using Linux Security Modules (LSM) in the Linux kernel, based on the principle of least privilege. A Linux kernel integrating SELinux enforces MAC policies that confine user programs/processes and system servers to the minimum amount of privilege they require for performing tasks. This is independent of the traditional Linux access control mechanisms.

To implement such confinement, SELinux provides a security context by associating access control attributes of the form user:role:type to all subjects (e.g., a medical application) and objects (e.g., files containing a medical record). Within that security context, the "type" attribute represents the type of the subject or the object (e.g., file, directory). The identification of subjects, objects and their access enforcement by means of types is formally known as Type Enforcement (TE). The "role" attribute within the security context is built upon the type attribute. This means that access control in SELinux is primarily enforced via TE. Instead of directly associating a user (e.g., Mr. XYZ—a doctor) with a type (e.g., medicalApplication_t), currently, SELinux associates a user with a role (e.g., Physician Role) and the role with a type. The role merely simplifies the management of users and access control is still enforced by the TE paradigm.

For security purposes, the traditional Linux operating system kernel includes a DAC module to determine if a program can have permission to access a resource. Referring to the architecture 10 in FIG. 1, a set of rules 11 specify the circumstances under which an accessing program (subject) 12 can access a resource or another program (object) 13. Based on the rules, a DAC module 14 in the Linux kernel decides if the access request is permitted or denied.

Figure 2:
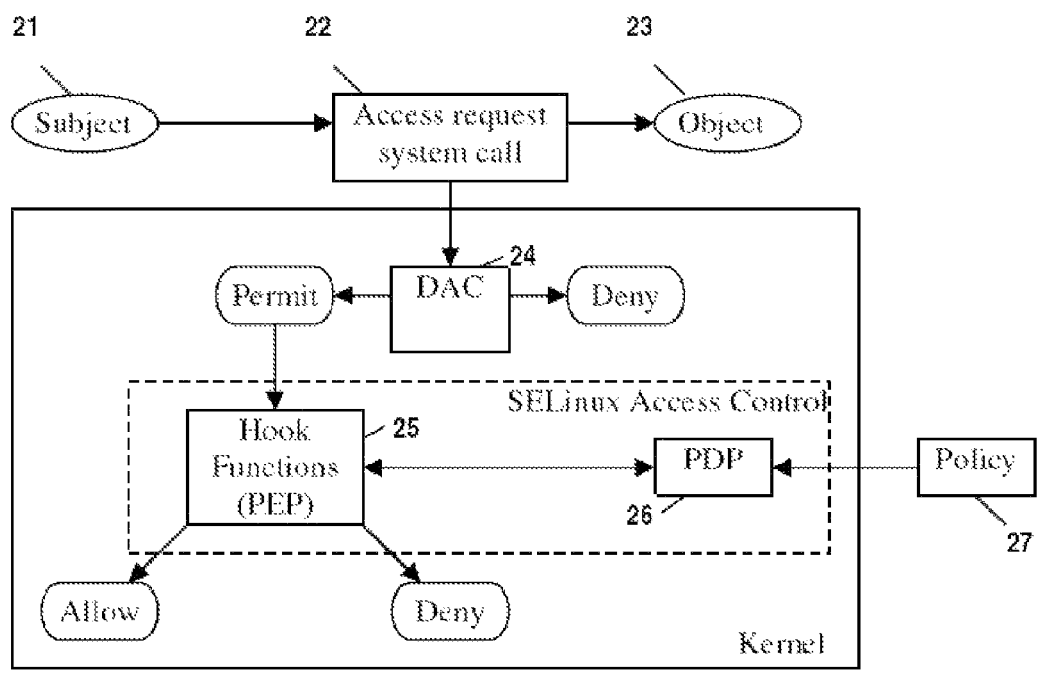
FIG. 2 depicts an architecture for an SELinux kernel utilizing hook functions in accordance with an embodiment of the present invention.

Referring to the architecture 20 in FIG. 2, according to SELinux when a subject 21 makes an access request system call 22 for access to an object 23, a DAC module 24 in the Linux kernel performs initial DAC checking, as described in relation to FIG. 1. If the DAC module 24 tentatively permits access, then hook functions 25 receive the access request and forward it to a policy decision point (PDP) 26 for further checking before access is allowed. The PDP is a loadable kernel module (LKM), wherein policies 27 are pre-defined and inserted into the PDP. Based on the policies, the PDP 26 makes the final decision as to whether the access request is allowed or denied. The hook functions 25 enforce the decisions (e.g., allow or deny access) from the PDP 26. Conceptually, these hook functions can be called policy enforcement point (PEP) functions.

In Linux, a set of system call functions to get and set affinity is included with kernel 2.5. In kernel 2.6, Secure Linux (SELinux) is implemented using a Linux Security Module (LSM). In an embodiment of the present invention, a set of hook functions are implemented by the security server of SELinux. These hooks are inserted into primitive system call functions of the kernel. Whenever a kernel function is called (e.g., open a file or socket), the corresponding security hook function is invoked to check the permission of the calling process. For example, passwd running with a root can open the password file in Linux while a normal user process cannot. SELinux can then define a set of policies that assign different types to different processes and objects (files, ports, etc.) and then specify the permissions of processes based on their types.

Access control mechanisms are usually viewed in terms of an access control matrix which lists active subjects (typically users of a computer system) in the rows of the matrix and passive objects (typically files and other system resources) in the columns as shown in FIG. 3. Because storing the entire matrix would consume far too much space once any realistic quantity of subjects or objects is present, real systems use either the rows or the columns of the matrix for access control decisions. Implementations which use a row-based implementation work by attaching a list of accessible objects to the subject, typically implemented using capabilities. Implementations which use a column-based implementation work by attaching a list of subjects allowed access to the object, typically implemented using access control lists (ACLs) or protection bits, a cut-down form of ACLs.

Capability-based systems issue capabilities or tickets to subjects which contain access rights such as read, write, or execute, and which the subject uses to demonstrate their right to access an object. Passwords are a somewhat crude form of capability which give up the fine-grained control provided by true capabilities in order to avoid requiring the user to remember and provide a different password for each object for which access is required. Capabilities have the property that they can be easily passed on to other subjects, and can limit the number of accessible objects to the minimum required to perform a specific task (for example a ticket could be issued which allowed a subject to access only the objects needed for the particular task at hand, but no more). The ease of transmission of capabilities can be an advantage but is also a disadvantage because the ability to pass them on can't be easily controlled, leading to a requirement that subjects maintain very careful control over any capabilities they possess and making revocation and access review (the ability to audit who has the ability to do what) extremely tricky.

ACL-based systems allow any subject to be allowed or disallowed access to a particular object. Just as passwords are a crude form of capabilities, so protection bits are a crude form of ACL's which are easier to implement but have the disadvantage that allowing or denying access to an object on a single-subject basis is difficult or impossible (for the most commonly-encountered implementation, Unix access control bits, single subject control works only for the owner of the object, but not for arbitrary collections of subjects). Although groups of subjects have been proposed as a partial solution to this problem, the combinatorics of this solution make it rather unworkable, and they exhibit a single-group analog of the single-subject problem.

A variation of the access-control based view of security is the information-flow based view, which assigns security levels to objects and only allows information to flow to a destination object of an equal or higher security level than that of the source object. In addition there exist a number of hybrid mechanisms which combine some of the best features of capabilities and ACLs or ones which try to work around the shortcomings of one of the two, for example by using the cached result of an ACL lookup as a capability, by providing per-object exception lists which allow capabilities to be revoked, or by extending the scope of one of the two approaches to incorporate portions of the other approach.

Figure 4:
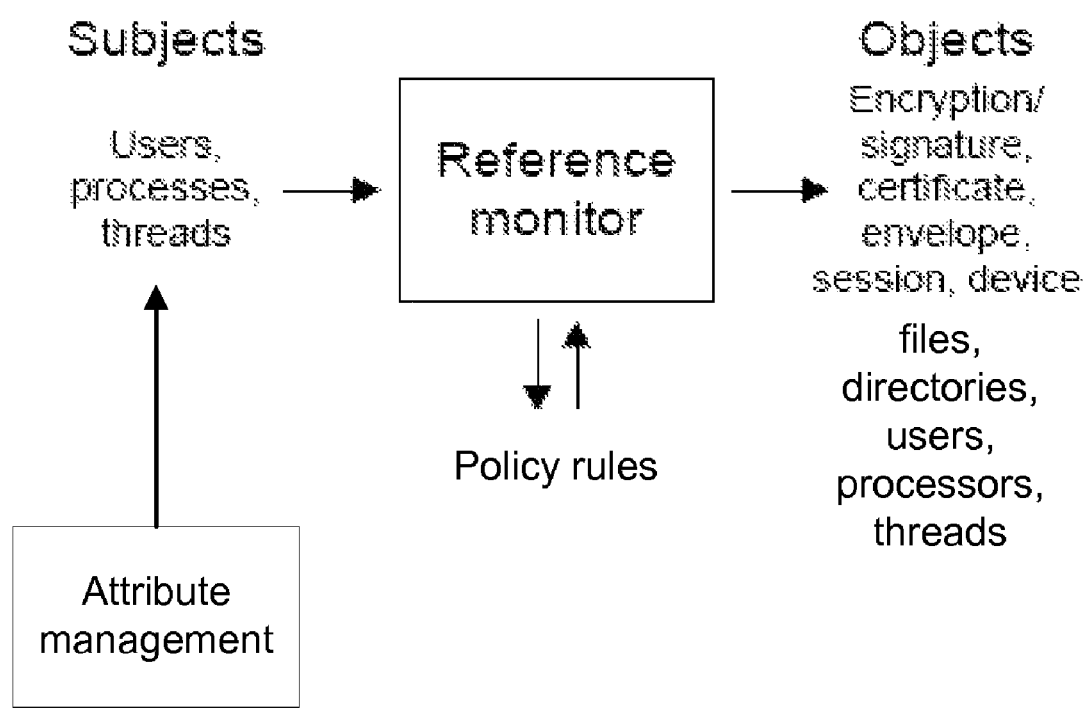
FIG. 4 illustrates a reference monitor in accordance with an embodiment of the present invention.

A reference monitor is the mechanism used to control access by a set of subjects to a set of objects as depicted in FIG. 4. The monitor is the subsystem which is charged with checking the legitimacy of a subject's attempts to access objects, and represents the abstraction for the control over the relationships between subjects and objects. It should have the properties that it is tamper-proof, always invoked, and simple enough to be open to a security analysis. A reference monitor implements the "mechanism" part of the "separation of policy and mechanism" requirement. The reference monitor may control the access using various policies or rules.

Thus, in an embodiment of the present invention, SELinux is used as a reference monitor to control a processes' capability to retrieve and set its or another process' affinity. It should be noted that prior to or during the execution of various steps of FIG. 5, one or more processes may be assigned to one or more attributes using a management tool. For SELinux embodiments, these attributes are SELinux types, but in other embodiments the attributes may be other elements. By doing so, the process can easily be mapped against a set of policies, which may describe various security settings based upon attribute (or, in SELinux embodiments, types.

Figure 5:
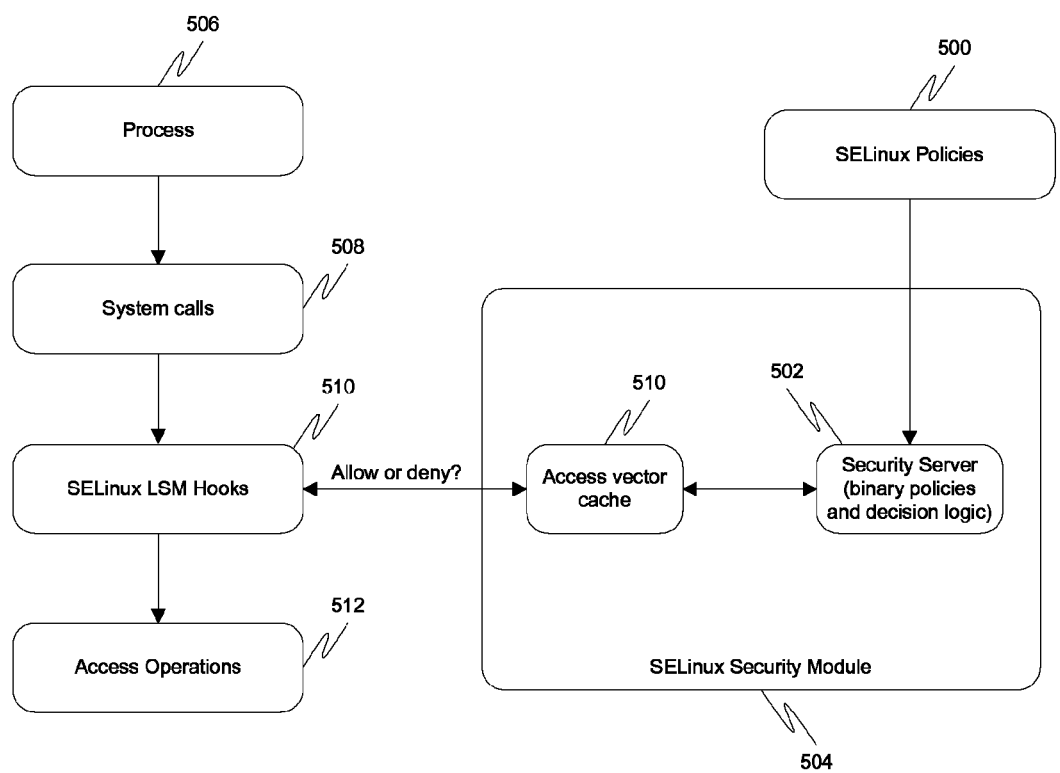
FIG. 5 depicts a mechanism for controlling a processes' capability to retrieve and set its or another process' affinity in accordance with an embodiment of the present invention.

FIG. 5 depicts a mechanism for performing this function in accordance with an embodiment of the present invention.

First, a set of policies 500 may be defined in SELinux. An example policy is the following:

Allow can_get_set-affinity_t prcoess_t: affinity_mask {get, set} where can_get_set_affinity_t is the type of privileged processes that can get and set any other process' affinity that is the type process_t. The following policy can enable a process in type of self_get_set_affinity_t can get and set the processor affinity of itself:

Allow self_get_set_affinity_t self: affinity_mask {get, set}

Different policies can be defined for getting and setting affinity capabilities, respectively. Other policies are needed to assign the type of a process. Policies may be compiled into binary form and loaded by the SELinux security server 502 within an SELinux Security Module 504.

Second, once policies are defined, a set of functions may be implemented in the SELinux security server. These functions check the parameters forwarded by hooks in the Linux Security module and make the decision to allow or deny according to binary policies. These parameters may include the types and processes identifications of the requesting processes.

Third, a set of hooks may be inserted into the kernel source code whenever system call functions sched_setaffinity or sched_getaffinity are called.

Fourth, at runtime, when a process 506 wants to get or set process affinity of another process or itself with system call functions sched_setaffinity or sched_getaffinity 508, the hooks 510 are invoked to send the parameters to the security server (e.g., accessing process identification and type and target processes identification and type). The security server then makes the decisions based on the policies and sends the results to the hooks. The hooks may either allow the access operation 512 or deny it with an exception.

Figure 6:
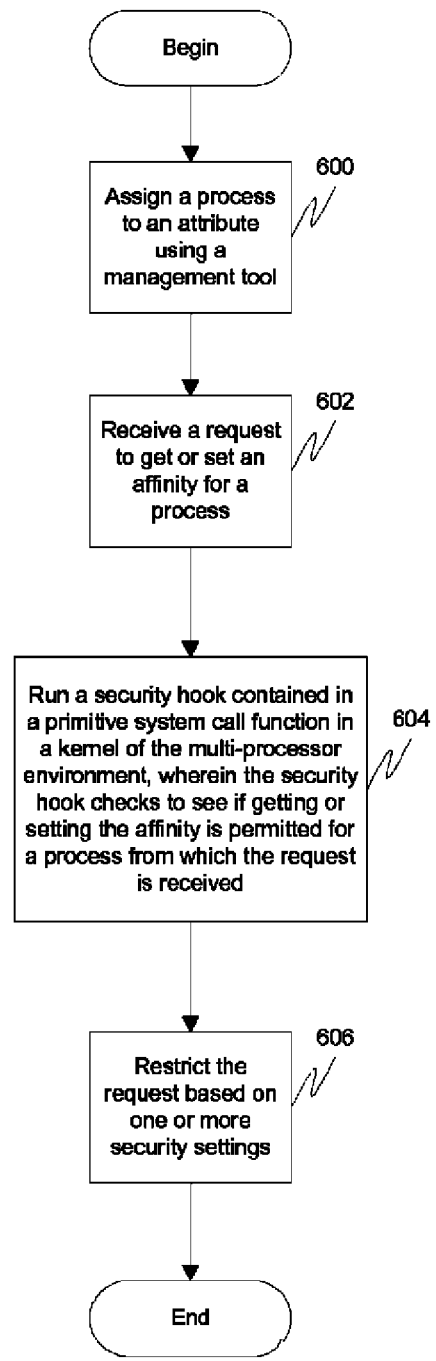
FIG. 6 is a flow diagram illustrating a method for controlling a multi-processor environment in accordance with an embodiment of the present invention.

FIG. 6 is a flow diagram illustrating a method for controlling a multi-processor environment in accordance with an embodiment of the present invention. Each of the steps of this method may be executed in hardware, software, or any combination thereof. At 600, a management tool may assign a process to an attribute. In an SELinux embodiment, this attribute may be an SELinux type. At 602, a request to get or set an affinity for a process is received. This may be received from a first process operating on a first processor, and the request may be to change the affinity of the first process to a second processor running a second process. Alternatively, the request may be to change the affinity of the second process to the first processor.

At 604, a security hook contained in a primitive system call function in a kernel of the multi-processor environment may be run, wherein the security hook checks to see if getting or setting the affinity is permitted for a process from which the request is received. This may be accomplished by accessing a security module that contains a set of defined policies. The defined policies may assign different types to different processes and objects and specify the permissions of processes based on their types.

At 606, the request may be restricted based on one or more security settings, such as the settings determined by the security hook.

In another implementation of the present invention, a configurable ruleset is used by the kernel. The advantage of a kernel which is based on a configurable ruleset is that it's possible to respond to changes in requirements without having to redesign the entire kernel. Each rule functions as a check on a given operation, specifying which conditions must hold in order for the operation to execute without breaching the security of the system. When the kernel is presented with a request to perform a given operation, it looks up the associated rule and either allows or denies the operation. The kernel also applies rules to the result of processing the request, although it appears to be fairly unique in this regard.

The use of a fixed kernel implementing a configurable rule-based policy provides a powerful mechanism which can be adapted to meet a wide variety of security requirements. One implementation of this concept, the Security Model Development Environment (SMDE), uses a rule-based kernel to implement various security models such as the Bell-LaPadula model, the military message system (MMS) model which is based on mandatory controls on information flow, and the MAC portion of the SeaView relational database model.

These policies are enforced by expressing each one in a common notation of which an example is:

```
static constraint Simple_Security_Policy
begin
-- for all subjects and objects it must be true that
for all sub : Subjects; ob : Objects |
-- current read or write access between a subject and an object implies that
( read in current_access( sub, ob ) or write in current_access( sub, ob ) ) -->
-- the current security label of the subject dominates the object
current_security_label( sub ) >= security_label( ob );
end Simple_Security_Policy;
```

This is then parsed by a model translator tool and fed to a rule generator which creates rules for use by the kernel based on the parsed policy information. Finally, the kernel itself acts as an interpreter for the rule generator. Another, more generalized approach, the Generalized Framework for Access Control (GFAC) proposed the use of a TCB-resident rule base which is queried by an access decision facility (ADF) with the decision results enforced by an access enforcement facility (AEF). The GFAC implements both MAC and DAC controls which can be configured to match a particular organization's requirements.

Figure 7:
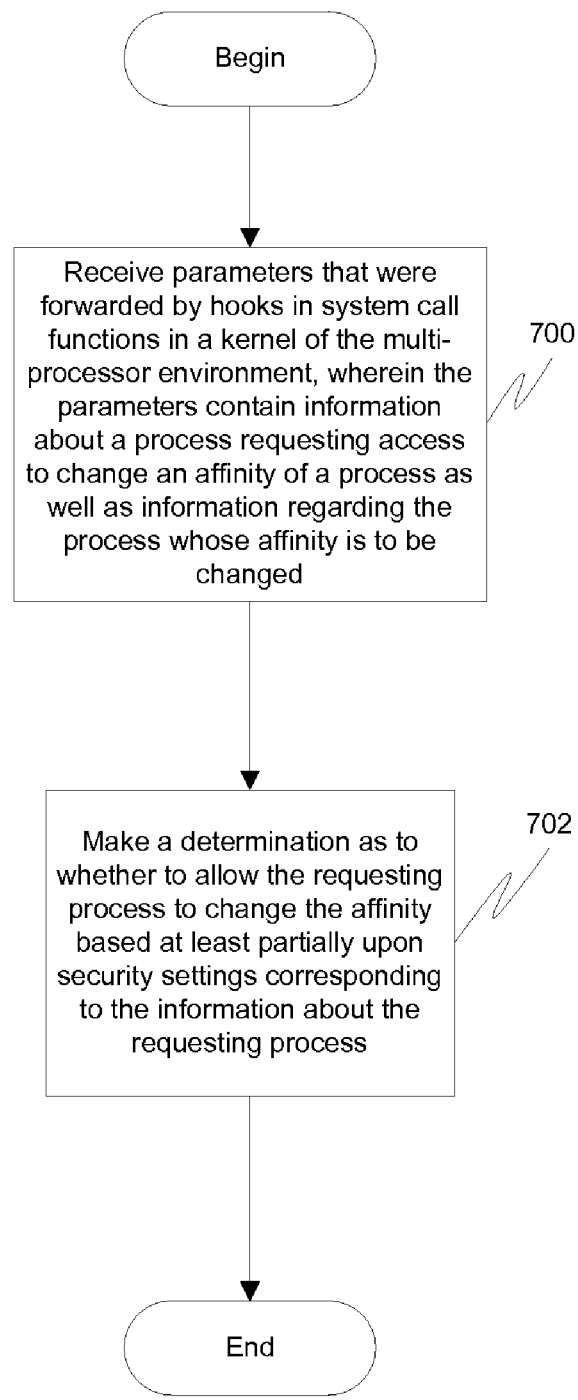
FIG. 7 is a flow diagram illustrating a method for preventing security breaches in a multi-processor environment in accordance with an embodiment of the present invention.

FIG. 7 is a flow diagram illustrating a method for preventing security breaches in a multi-processor environment in accordance with an embodiment of the present invention. Each of the steps of this method may be executed in hardware, software, or any combination thereof. At 700, parameters may be received that were forwarded by hooks in system call functions in a kernel of the multi-processor environment, wherein the parameters contain information about a process requesting access to change an affinity of a process as well as information regarding the process whose affinity is to be changed. At 702, a determination may be made as to whether to allow the requesting process to change the affinity based at least partially upon security settings corresponding to the information about the requesting process.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for controlling a multi-processor environment, comprising:
    assigning one or more processes to one or more attributes;
    receiving a request to get or set an affinity for a process;
    running an initial check of permissions at a Discretionary Access Control (DAC) control module;
    running a second check of permissions in a secure environment to serve as a reference monitor for setting affinity by using a security hook contained in a primitive system call function in a kernel of the multi-processor environment for policy enforcement, wherein the security hook checks to see if getting or setting the affinity is permitted for a process from which the request is received wherein the security hook checks to see if getting or setting the affinity is permitted by accessing a security module in the kernel, the security module having a set of defined policies, wherein assigned attributes are mapped against the set of policies; and
    restricting the request based on one or more security settings.

2. The method of claim 1, wherein the receiving a request includes receiving a request from a first process.

3. The method of claim 2, wherein the first process is operating on a first processor and the request is a request to change the affinity of the first process to a second processor running a second process.

4. The method of claim 2, wherein the first process is operating on a first processor and the request is a request to change the affinity of a second process running on a second processor to the first processor.

5. The method of claim 1, wherein the security module contains a set of defined policies.

6. The method of claim 5, wherein the defined policies assign different types to different processes and objects and specify the permissions of processes based on their types.

7. The method of claim 1, further comprising:
    assigning the process to an attribute using a management tool.

8. A method for controlling a secure multi-processor environment, comprising:
    assigning one or more processes to one or more attributes including type attributes;
    receiving a request to get or set an affinity for a process;
    running a security hook contained in a primitive system call function in a kernel of the secure multi-processor environment to perform policy enforcement to serve as a reference monitor for setting affinity, wherein the security hook checks to see if getting or setting the affinity is permitted for a process from which the request is received wherein the security hook checks to see if getting or setting the affinity is permitted by accessing a security module, the security module residing in the kernel and including a set of defined policies to map different types of processes and object and specify the permissions of processes based on their types; and
    restricting the request based on one or more security settings.

9. A method for preventing security breaches in a multi-processor environment, the method comprising:
    assigning one or more processes to one or more attributes;
    receiving a request to get or set an affinity for a process;
    running an initial check of permissions at a Discretionary Access Control (DAC) control module;
    running a second check of permissions to serve as a reference monitor for setting affinity by using security hooks contained in primitive system call functions in a kernel of the multi-processor environment to perform policy enforcement;
    receiving, at a policy decision point module residing in a Security Module in the kernel parameters forwarded by the hooks in system call functions in a kernel of the multi-processor environment, wherein the parameters contain information about a process requesting access to change an affinity of a process as well as information regarding the process whose affinity is to be changed; and
    determining whether to allow the requesting process to change the affinity based at least partially upon security settings corresponding to the information about the requesting process.

10. An apparatus for controlling a multi-processor environment, comprising:
    management tool means for assigning one or more processes to one or more attributes;

means in a secure environment for receiving a request to get or set an affinity for a process;

reference monitor means in the secure environment for running a security hook contained in a primitive system call function in a kernel of the multi-processor environment to perform policy enforcement, wherein the security hook checks to see if getting or setting the affinity is permitted for a process from which the request is received; and means for restricting the request based on one or more security settings.

11. The apparatus of claim 10, wherein the means for receiving a request includes means for receiving a request from a first process.

12. The apparatus of claim 11, wherein the first process is operating on a first processor and the request is a request to change the affinity of the first process to a second processor running a second process.

13. The apparatus of claim 11, wherein the first process is operating on a first processor and the request is a request to change the affinity of a second process running on a second processor to the first processor.

14. The apparatus of claim 10, wherein the security hook checks to see if getting or setting the affinity is permitted by accessing a security module.

15. The apparatus of claim 14, wherein the security module contains a set of defined policies.

16. The apparatus of claim 15, wherein the defined policies assign different types to different processes and objects and specify the permissions of processes based on their types.

17. The apparatus of claim 10, further comprising a management tool for assigning the process to an attribute.

18. A system for controlling a multi-processor environment, comprising:

two or more processors;

a management tool to assign one or more processes to one or more attributes;

an operating system configured to send a request to get or set an affinity for a process to a security module residing in a kernel to act as a reference monitor for setting affinity;

and wherein the security module includes a security server that is configured to restricting the request based on one or more security settings;

the security server configured to receive parameters forwarded by hooks in system call functions in the kernel of the multi-processor environment, wherein the parameters contain information about a process requesting access to change an affinity of a process as well as information regarding the process whose affinity is to be changed, and to determine whether to allow the requesting process to change the affinity based at least partially upon security settings corresponding to the information about the requesting process.

19. The system of claim 18 wherein the security module contains a set of defined policies.

20. The system of claim 19, wherein the defined policies assign different types to different processes and objects and specify the permissions of processes based on their types.

* * * * *